United States Patent
Gibson

(10) Patent No.: US 10,126,928 B2
(45) Date of Patent: Nov. 13, 2018

(54) VEHICLE HUMAN MACHINE INTERFACE WITH AUTO-CUSTOMIZATION

(71) Applicant: MAGNA ELECTRONICS INC., Auburn Hills, MI (US)

(72) Inventor: Joel S. Gibson, Linden, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 523 days.

(21) Appl. No.: 14/672,698

(22) Filed: Mar. 30, 2015

(65) Prior Publication Data

US 2015/0277735 A1  Oct. 1, 2015

Related U.S. Application Data

(60) Provisional application No. 61/972,707, filed on Mar. 31, 2014.

(51) Int. Cl.
| | |
|---|---|
| *G06F 3/0484* | (2013.01) |
| *H04R 1/02* | (2006.01) |
| *B60Q 9/00* | (2006.01) |
| *G06F 3/0488* | (2013.01) |
| *G06F 3/01* | (2006.01) |
| *G06F 3/044* | (2006.01) |
| *H04R 1/20* | (2006.01) |
| *H04R 5/00* | (2006.01) |
| *H04R 29/00* | (2006.01) |

(52) U.S. Cl.
CPC ........... *G06F 3/04847* (2013.01); *B60Q 9/00* (2013.01); *G06F 3/016* (2013.01); *G06F 3/044* (2013.01); *G06F 3/0488* (2013.01); *H04R 1/028* (2013.01); *H04R 1/20* (2013.01); *H04R 5/00* (2013.01); *H04R 29/002* (2013.01); *G06F 2203/04103* (2013.01); *G06F 2203/04809* (2013.01); *H04R 2499/13* (2013.01)

(58) Field of Classification Search
CPC ... G06F 3/04847; G06F 3/0488; H04R 1/028; B60Q 9/00; G06K 9/0002; G06K 9/00013
See application file for complete search history.

(56) References Cited

U.S. PATENT DOCUMENTS

| | | |
|---|---|---|
| 3,626,365 A | 12/1971 | Press |
| 4,930,742 A | 6/1990 | Schofield et al. |
| 4,959,865 A | 9/1990 | Stettiner et al. |
| 4,975,966 A | 12/1990 | Sapiejewski |
| 5,329,593 A | 7/1994 | Lazzeroni et al. |
| 5,671,996 A | 9/1997 | Bos et al. |

(Continued)

*Primary Examiner* — Abbas Abdulselam
(74) *Attorney, Agent, or Firm* — Honigman Miller Schwartz and Cohn, LLP

(57) ABSTRACT

A human machine interface system for a vehicle includes a control and a user input actuatable by a user and associated with at least one accessory of a vehicle. The user input includes a touch screen having a deformable touch surface that is deformable to form a plurality of protruding user inputs. The user inputs of the touch surface are adjustable responsive to a proximity of the user's hand. Optionally, a plurality of speakers may be operable to generate respective audible outputs, with the speakers being disposed at the vehicle remote from the user input. The control, responsive to actuation by the user of the user input, controls the speakers to generate respective sounds at the speakers so that a resulting sound is perceived by the user to be originating at or near the user input.

20 Claims, 17 Drawing Sheets

(56) References Cited

U.S. PATENT DOCUMENTS

| | | |
|---|---|---|
| 5,703,957 A | 12/1997 | McAteer |
| 5,820,245 A | 10/1998 | Desmond et al. |
| 5,828,012 A | 10/1998 | Repollé et al. |
| 5,850,016 A | 12/1998 | Jung et al. |
| 5,877,897 A | 3/1999 | Schofield et al. |
| 5,878,147 A | 3/1999 | Killion et al. |
| 5,979,586 A | 11/1999 | Farmer |
| 6,166,625 A | 12/2000 | Teowee et al. |
| 6,243,003 B1 | 6/2001 | DeLine et al. |
| 6,278,377 B1 | 8/2001 | DeLine et al. |
| 6,326,613 B1 | 12/2001 | Heslin et al. |
| 6,329,925 B1 | 12/2001 | Skiver et al. |
| 6,363,156 B1 | 3/2002 | Roddy |
| 6,366,213 B2 | 4/2002 | DeLine et al. |
| 6,420,975 B1 | 7/2002 | DeLine et al. |
| 6,428,172 B1 | 8/2002 | Hutzel et al. |
| 6,433,676 B2 | 8/2002 | DeLine et al. |
| 6,485,081 B1 | 11/2002 | Bingle et al. |
| 6,501,387 B2 | 12/2002 | Skiver et al. |
| 6,614,911 B1 | 9/2003 | Watson et al. |
| 6,648,477 B2 | 11/2003 | Hutzel et al. |
| 6,690,268 B2 | 2/2004 | Schofield et al. |
| 6,717,524 B2 | 4/2004 | DeLine et al. |
| 6,774,356 B2 | 8/2004 | Heslin et al. |
| 6,798,890 B2 | 9/2004 | Killion et al. |
| 6,882,734 B2 | 4/2005 | Watson et al. |
| 6,906,632 B2 | 6/2005 | DeLine et al. |
| 6,980,092 B2 | 12/2005 | Turnbull et al. |
| 6,980,663 B1 | 12/2005 | Linhard |
| 7,038,577 B2 | 5/2006 | Pawlicki et al. |
| 7,308,341 B2 | 12/2007 | Schofield |
| 7,415,116 B1 | 8/2008 | Fels |
| 7,657,052 B2 | 2/2010 | Larson et al. |
| 7,720,580 B2 | 5/2010 | Higgins-Luthman |
| 7,855,755 B2 | 12/2010 | Weller et al. |
| 8,154,418 B2 | 4/2012 | Peterson et al. |
| 8,258,932 B2 | 9/2012 | Wahlstrom |
| 8,275,145 B2 | 9/2012 | Buck |
| 8,355,521 B2 | 1/2013 | Larson et al. |
| 8,508,831 B2 | 8/2013 | De Wind et al. |
| 8,547,339 B2 | 10/2013 | Ciesla |
| 8,730,553 B2 | 5/2014 | De Wind et al. |
| 8,824,697 B2 | 9/2014 | Christoph |
| 9,346,403 B2 | 5/2016 | Uken et al. |
| 9,397,630 B2 | 7/2016 | Wang |
| 9,598,016 B2 | 3/2017 | Blank et al. |
| 2002/0032510 A1 | 3/2002 | Turnbull et al. |
| 2002/0080021 A1 | 6/2002 | Skiver et al. |
| 2002/0110255 A1 | 8/2002 | Killion et al. |
| 2002/0110256 A1 | 8/2002 | Watson et al. |
| 2004/0170286 A1 | 9/2004 | Durach |
| 2006/0023892 A1 | 2/2006 | Schultz |
| 2010/0049434 A1* | 2/2010 | Liu ............... G01C 21/3629 701/533 |
| 2011/0050589 A1* | 3/2011 | Yan ............... B60K 37/06 345/173 |
| 2012/0230504 A1 | 9/2012 | Kuroda |
| 2012/0282908 A1* | 11/2012 | Nicolini ............... H04W 4/04 455/418 |
| 2014/0096003 A1* | 4/2014 | Vu ............... B60J 7/043 715/727 |
| 2014/0195923 A1* | 7/2014 | Cantrell ............... G06F 3/04886 715/746 |
| 2014/0320429 A1* | 10/2014 | Takano ............... G06F 1/1694 345/173 |
| 2015/0022664 A1 | 1/2015 | Pflug et al. |
| 2015/0029155 A1* | 1/2015 | Lee ............... G06F 3/042 345/175 |
| 2015/0137998 A1 | 5/2015 | Marti |
| 2015/0294169 A1 | 10/2015 | Zhou et al. |
| 2015/0296135 A1 | 10/2015 | Wacquant et al. |
| 2016/0029111 A1 | 1/2016 | Wacquant et al. |
| 2016/0209647 A1 | 7/2016 | Fuerisch |
| 2016/0364620 A1* | 12/2016 | Akiyama ............... H04N 7/188 |

* cited by examiner

VEHICLE HUMAN MACHINE INTERFACE WITH AUTO-CUSTOMIZATION

CROSS REFERENCE TO RELATED APPLICATION

The present application is related to U.S. provisional application Ser. No. 61/972,707, filed Mar. 31, 2014, which is hereby incorporated herein by reference in its entirety.

FIELD OF THE INVENTION

The present invention relates generally to a vehicle accessory or system and, more particularly, to user inputs for controlling a vehicle accessory or system.

BACKGROUND OF THE INVENTION

Various systems and accessories of vehicles are user actuated or controlled via one or more user inputs. Vehicle human machine interfaces (HMI) traditionally comprise buttons, switches, levers and/or knobs (mechanical input elements) which typically have just one specific function and typically provide a tangible (as well as tactile and/or haptic, referred to herein as tactile) feedback by its rest positions or transition resistance (the force required to push a button down may abruptly diminish when the functional state changes such as from off to on). Typically, there may be an additional optical user feedback comprised of the likes of backlighting or a lamp in the instrument cluster. The actuation of the function itself is naturally another feedback. Also typical in traditional automotive HMIs is that functional actuations are accompanied by a sound or audible signal which may be provided mechanically by the actuated mechanical input element itself (such as a click sound from a physically existing relay, which becomes actuated) or artificially by a sound generating device such as a speaker (generating a click sound which may come close to a sound a clicking relays would emit, but in reality a transistor may actuate the controlled function quietly instead, such as like a blinker signal indicator).

SUMMARY OF THE INVENTION

The present invention provides a user input or human machine interface (HMI) for an accessory or system of a vehicle, such as for a vision system or imaging system for a vehicle that utilizes one or more cameras (preferably one or more CMOS cameras) to capture image data representative of images exterior of the vehicle, and provides a video display of captured images to assist the driver in a driving maneuver.

According to an aspect of the present invention, a human machine interface system for a vehicle includes a user input and a control. The user input is actuatable by a user and associated with at least one accessory of a vehicle. The user input comprises a touch screen having a deformable touch surface that is adjustable or deformable to form a plurality of protruding user inputs. The touch screen may comprise a proximity sensor and, responsive to detection by the proximity sensor that a user's hand is at or near the touch screen, the deformable touch surface is adjusted to protrude the user inputs from a plane of the touch screen.

Optionally, the user inputs may comprise a plurality of icons or letters, and the deformable touch surface is deformable to adjust the size of the icons or letters responsive to at least one of (i) biometric information of the user and (ii) learned actions of the user. Optionally, the deformable touch surface is deformable to adjust the user inputs responsive to a proximity of the user's hand, whereby an arrangement of the user inputs is adjustable to follow the user's hand or finger when the user's hand or finger is not contacting said touch surface but moving across and over the touch surface.

According to another aspect of the present invention, a human machine interface system for a vehicle includes a user input and a control. The user input is actuatable by a user and associated with at least one accessory of a vehicle. At least three speakers are operable to generate respective audible signals, with the at least three speakers disposed at the vehicle remote from the user input. The control, responsive to actuation by the user of the user input, controls the speakers to generate respective sounds at the speakers so that a resulting sound is perceived by the user to be originating at or near the user input.

Optionally, the control, responsive to a vehicle function, may be operable to generate respective sounds at the speakers so that a second resulting sound is perceived by the user to be originating at a location associated with the vehicle function. For example, if the vehicle function comprises a vision system of the vehicle, the second resulting sound may be perceived by the user to be originating at or near or towards a location where an object is detected external the vehicle.

These and other objects, advantages, purposes and features of the present invention will become apparent upon review of the following specification in conjunction with the drawings.

DESCRIPTION OF THE PREFERRED EMBODIMENTS

Figure 1:
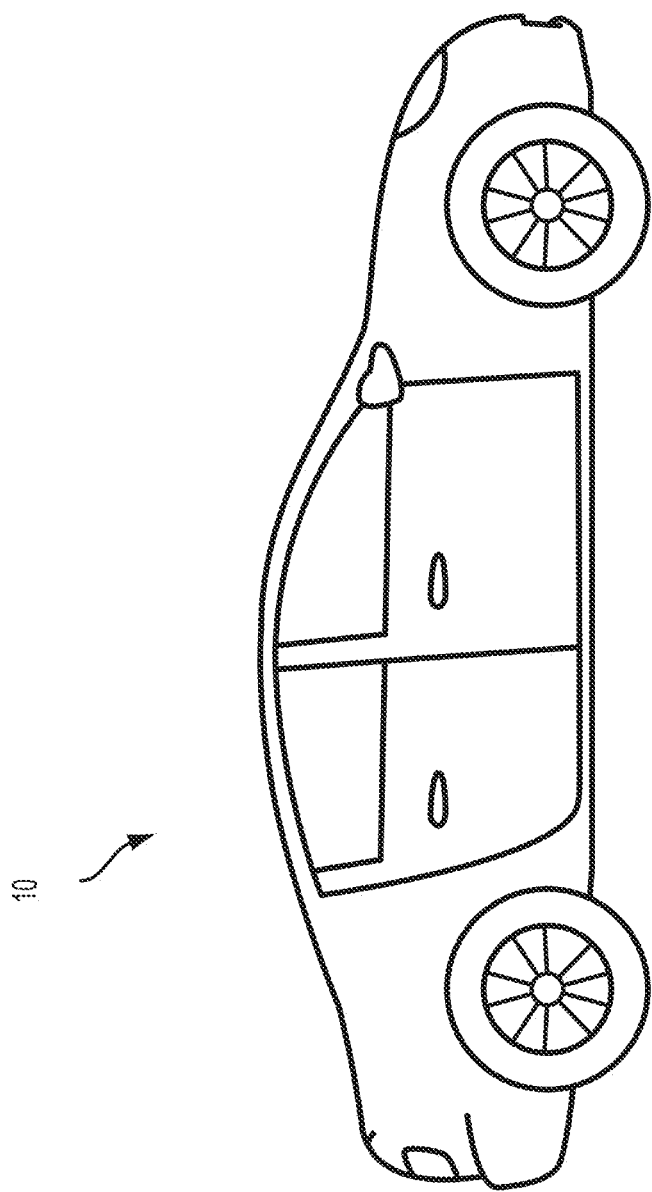
FIG. 1 is a side view of a vehicle equipped with a human machine interface system in accordance with the present invention.

A vehicle accessory or system may be operated or actuated/deactuated or controlled via one or more user inputs or HMIs that are accessible and actuatable by a driver or passenger of a vehicle equipped with the accessory or system and HMI(s).

The acoustical, tactile, visibly and hearable input feedback (-types) helps the vehicle user to input intuitively. Thus, it is desirable to have all four types (tactile/haptic, visual, audible, actuation) present in all kinds of input device or human interface device. Some of the input devices used in vehicles today do not have all these.

The audible feedback is often well accomplished since it's readily provided, such as by one or more speakers that are typically present in the vehicle. The user is accustomed to the dislocation of the input device and the audio emitting device.

Modern vehicle HMI or input devices (such as touch panel devices, gesture recognition devices, proximity sensors and eye gaze recognition devices and/or the like) are all lacking on haptic feedback.

In accordance with the present invention, the in-vehicle sound system, such as surround loudspeaker systems, may have at least three, preferably more than three loudspeakers for generating an artificial spot of the sound source. The speakers or speaker outputs can be controlled in a way that the artificial sound source spot (where the user thinks the sound is coming from based on different sound signals from the at least three speakers) is identical or at least close to the location of an input or output device or HMI, which the audio feedback or spontaneous or automatic function actuation/deactivation is accompanied by an artificial sound (such as a knock or click sound). For example, the beeping sound which is for indicating the distance to an acknowledged structure (such as sensed by ultrasound sensors which are installed in the front and rear bumper area of the vehicle) to warn against collisions may be generated in a way that the sound source seems to come from that corner or sensor of the vehicle at which the ultrasonic measured distance is the closest.

Optionally, and in accordance with another aspect of the present invention, the HMI may be operable to, at the same time as the sound above, provide another different sound to indicate the second closest ultrasonic measured distance at that according corner or sensor position. The sequence of the sounds may indicate to the driver the determined distance to the object. Optionally, for example, when the turn indicator is on, an artificial blinking sound may be generated in a way that the sound source seems to come from that side of the vehicle at which the blinker is blinking.

Therefore, the present invention provides an HMI or control that, responsive to actuation of a user input or the like, generates an audible signal that is associated with the actuation of the user input or the selected function. The audible signal is generated by three or more speakers in a manner that causes the apparent source of the sound to be at a particular location at or in or near the vehicle, such as at or near where the user input is located or at or near where the selected function is operating or the like. The HMI or control of the present invention thus provides an enhanced audible feedback to the user that the user can readily recognize as being associated with the user input and/or selected or actuated function or accessory or system.

Figure 2:
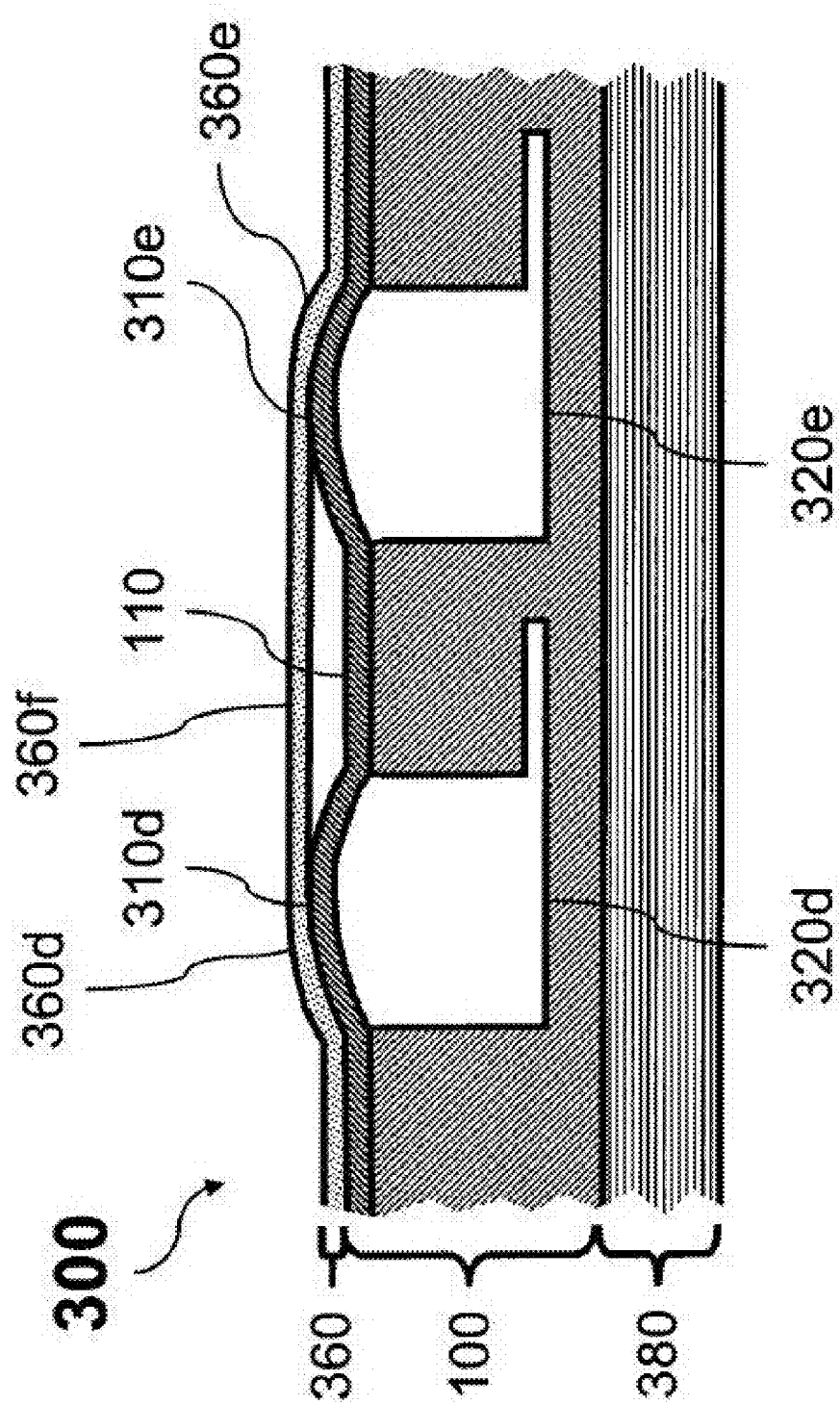
FIGS. 2-15 are views of user inputs and aspects of user inputs that are useful with the present invention.
Figure 3:
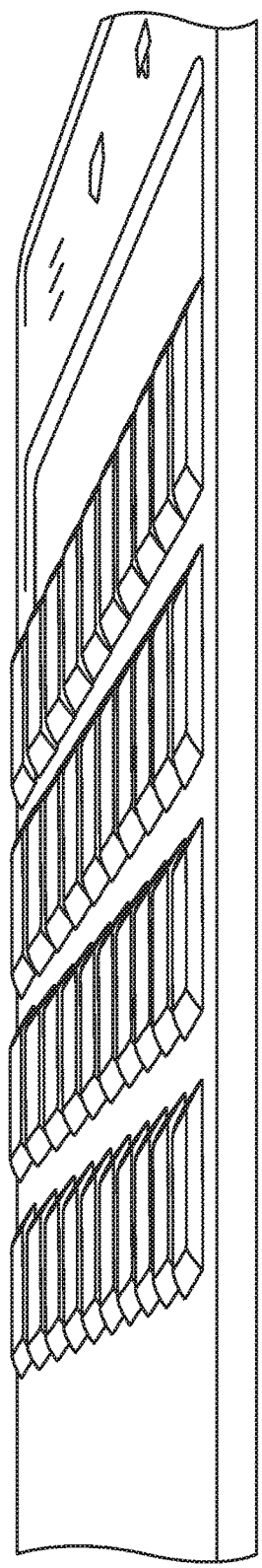
Figure 4:
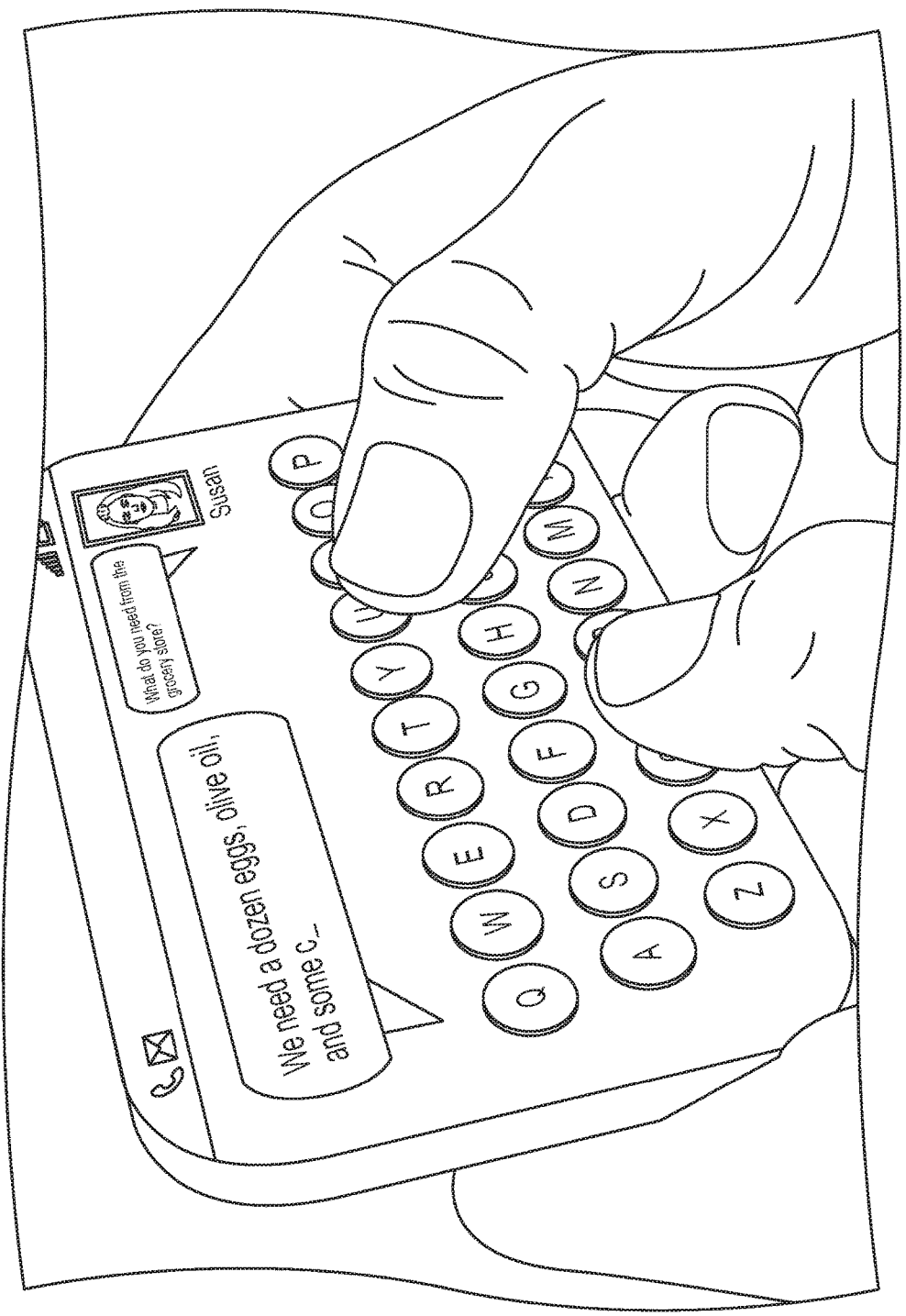
Figure 5:
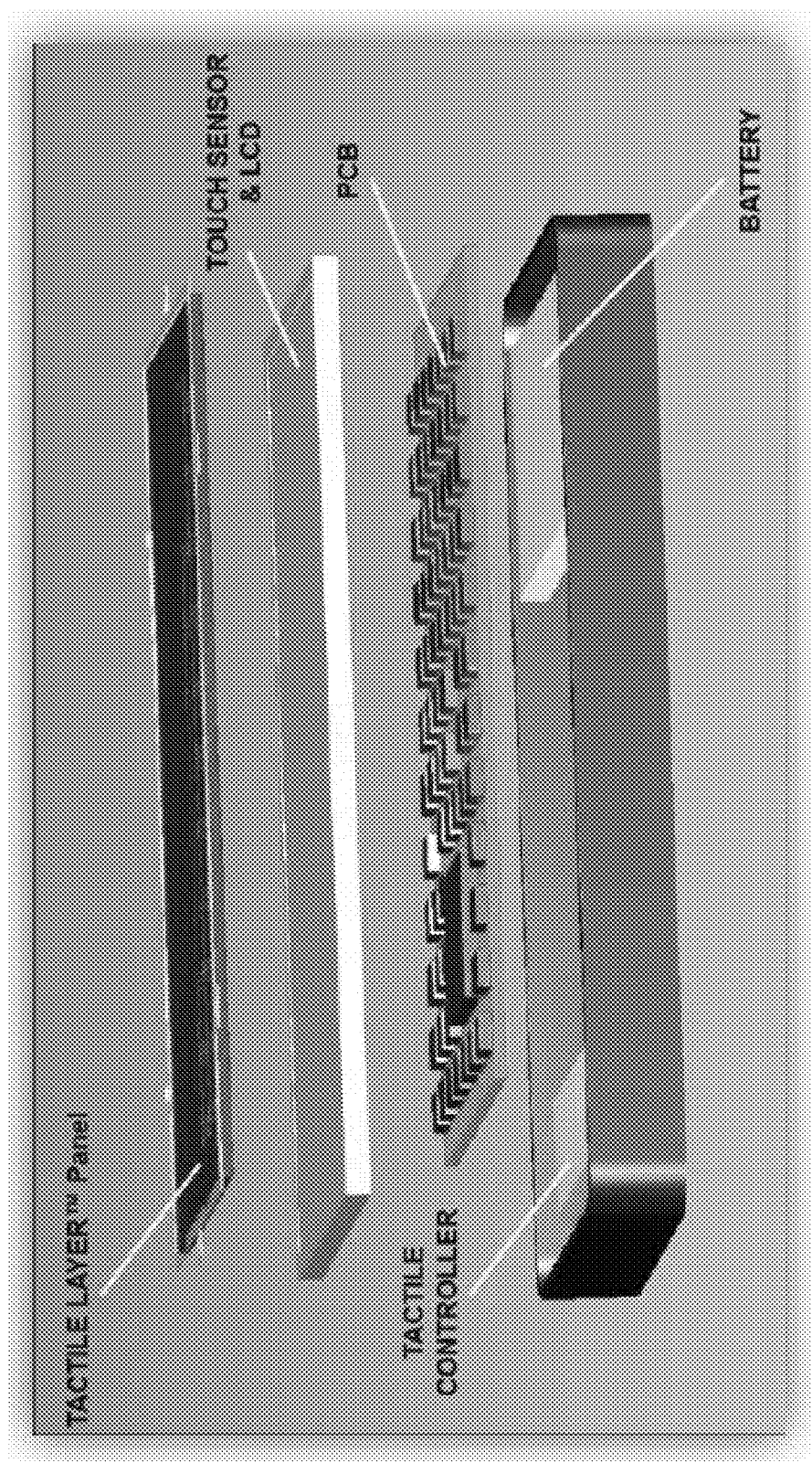
Figure 6:
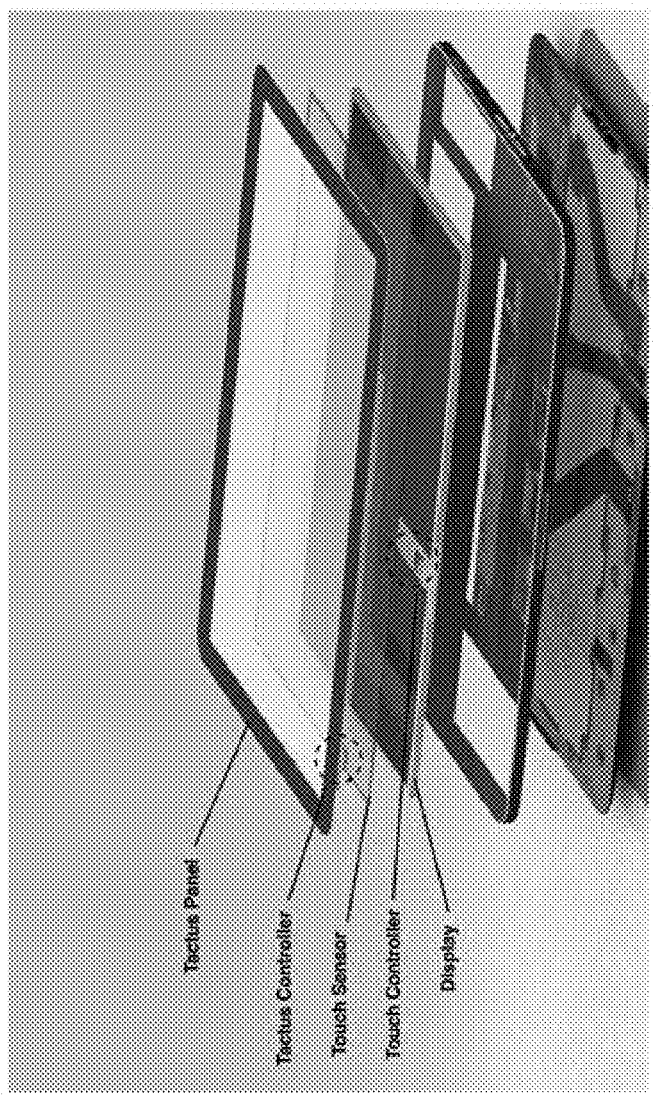
Figure 7:
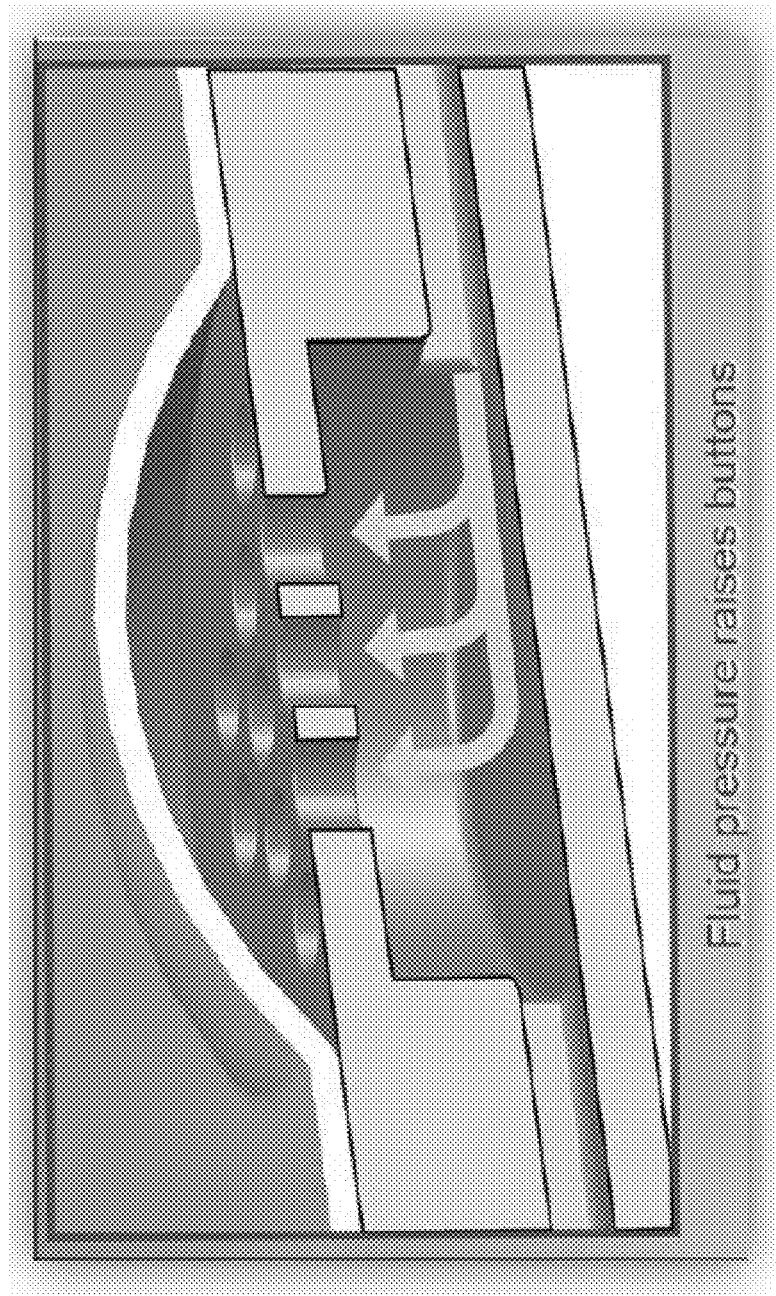
Figure 8:
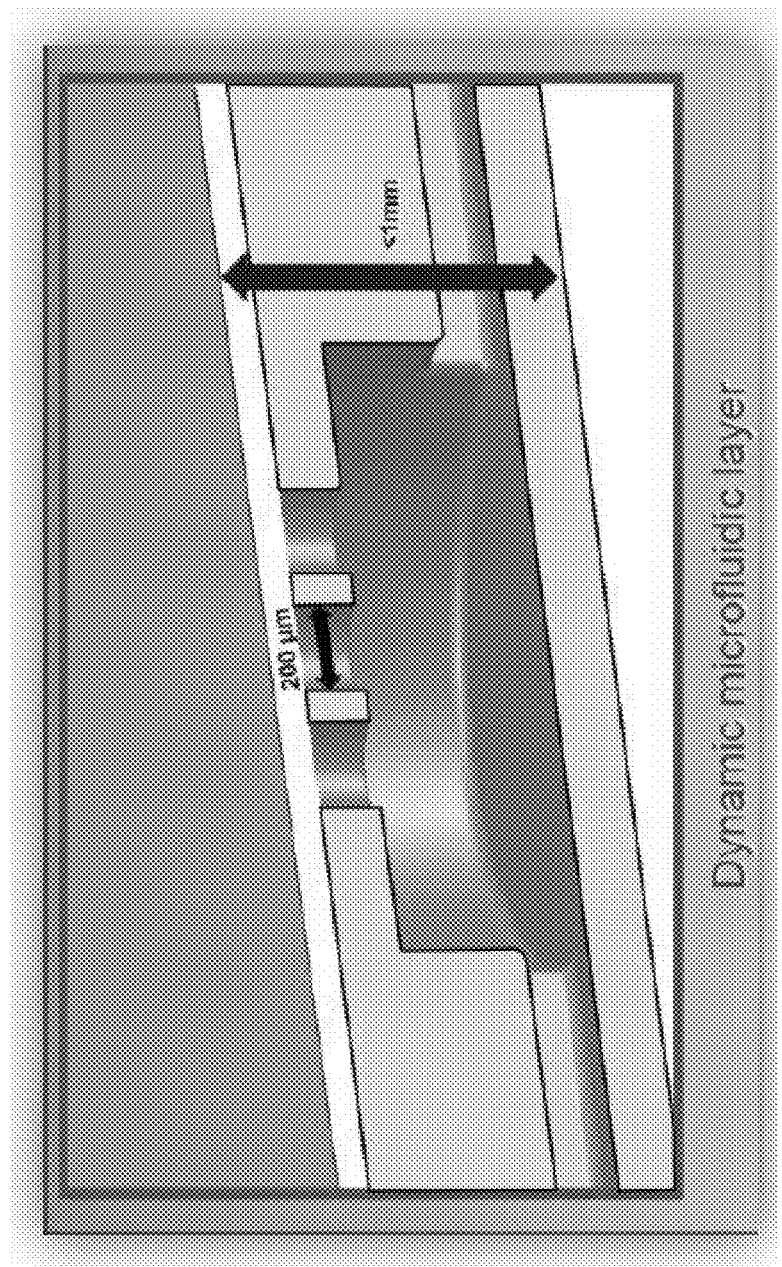

Vehicle control gestures functions detected by visually based devices or by proximity sensing devices may be used, such as by utilizing aspects of the systems described in International Publication No. WO 2013/109869, which is hereby incorporated herein by reference in its entirety. Also, flexible touch screens that have additional actuators underneath to temporarily deform the screen's surface in a way that its deformation is tangible to a user touching that screen may be implemented, such as by utilizing aspects of the systems described in International Publication No. WO 2013/109869. Button-like structures may be formed, such as described in U.S. Pat. No. 8,547,339 (which is hereby incorporated herein by reference in its entirety) and such as shown in FIG. 2 (FIG. 2 is an extract from U.S. Pat. No. 8,547,339). Such structures are being developed by Tactus Technology Inc., Fremont, Calif. (US), which shows the images of FIGS. 3-8 of the working principle on its website (http://tactustechnology.com). The actuators described in U.S. Pat. No. 8,547,339 were made by chambers underneath the touch screen (see FIGS. 2, 7 and 8) which can be filled by a fluid when actuated (see FIG. 7). The chambers are immobile. When filled, the surface stands out of concave. By that, the buttons can be formed locally (see FIGS. 3 and 4). When retracting the fluid the chambers retract or reform to nearly no height and are nearly not visible and not tangible any more (see FIG. 8).

Figure 13:
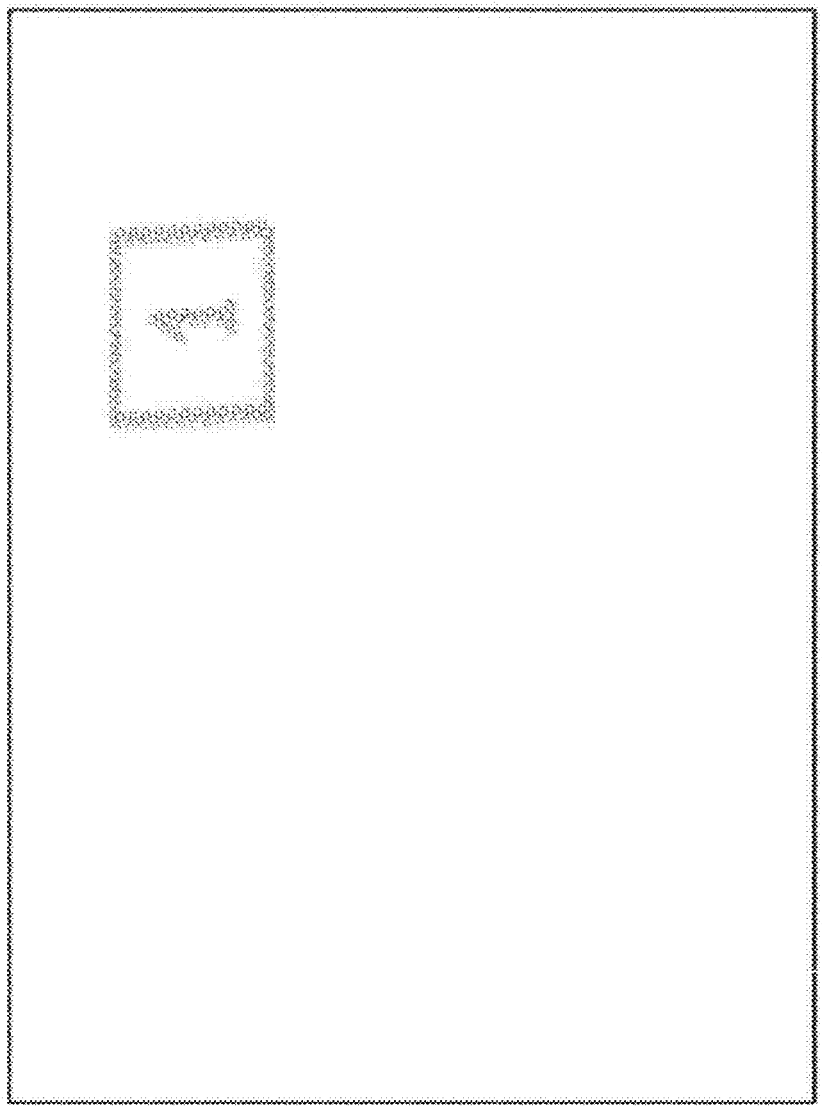
Figure 14:
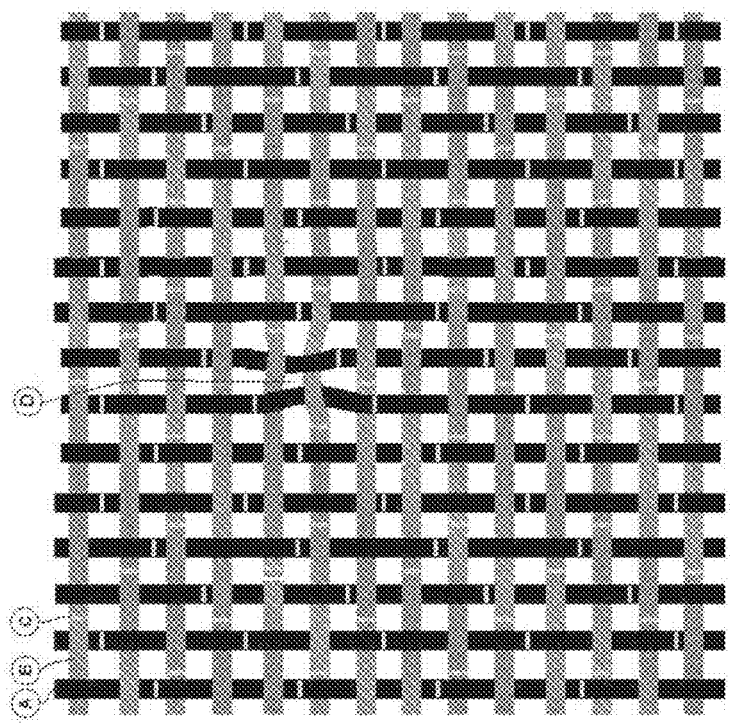

Rough structural arrangements may be formable by actuating a plurality of chambers (see FIG. 2). International Publication No. WO 2013/109869 suggests to either use pin or needle like actuators propelled to pop out a point on a touch screen via actuating embedded coils seated in dense neighborhood (see FIG. 13) or propelled by electro active polymers or alternatively by using electro pneumatic artificial muscles or carbon nanotube muscles which strings are arranged in a meshwork (see FIGS. 14 and 15). Alternatively, pin or needle actuators may be actuated by piezo stack actuators. Because the meshwork is homogeneous in two dimensions it can actuate a popping out of the touch screen at any desired location and the popped out areas can wander around or merge with other actuated areas, in wave like manner. Complex tangible structures can be formed and can alter smoothly. The use of pin or needle like actuators can freely form any shape of a limited height (see FIG. 13). The touching position can be detected by the touch screen or by detection by the actuator itself. Giving haptic feedback to a user input touching or pressing a structured, tangible button such as like inverting a button (formed by an actuated structure) upon touching can be provided.

As another aspect of the present invention, the touchpad with freely formable tangible structures (such as of the types described in International Publication No. WO 2013/109869) may be used to form buttons at substantially every desirable position. Buttons may be arranged in a scheme to form a QWERTY or QWERTZ keyboard, optionally with additional keys, sliders or adjusting wheels. The sliders or adjusting wheels may have elevated knobs which may be controlled to behave like the elevated knobs are rolling away from the force into the direction a user is pushing to. A keypad may be formed with fixed keys, such as by utilizing aspects of the systems described in U.S. Pat. No. 8,547,339. Optionally, and such as by utilizing aspects of the systems described in International Publication No. WO 2013/109869, the structures may be formed so the buttons can be arranged freely and these can be positioned independently, in independent size, and these can float around freely.

Figure 9:
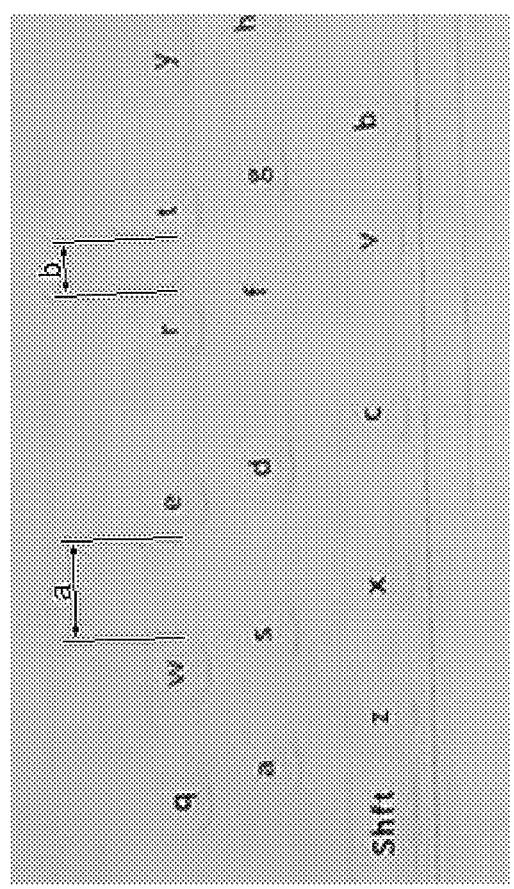
Figure 10:
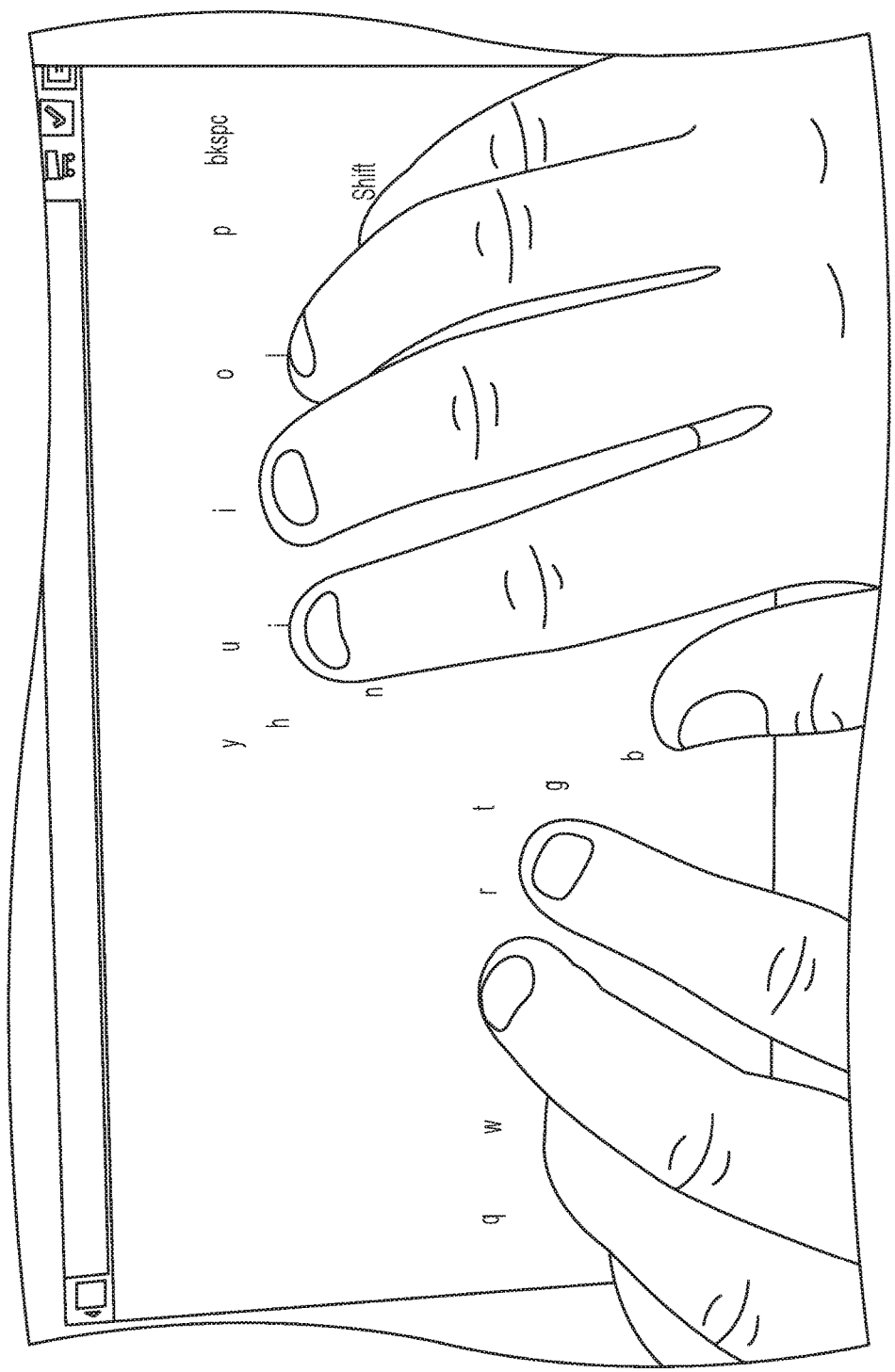
Figure 11:
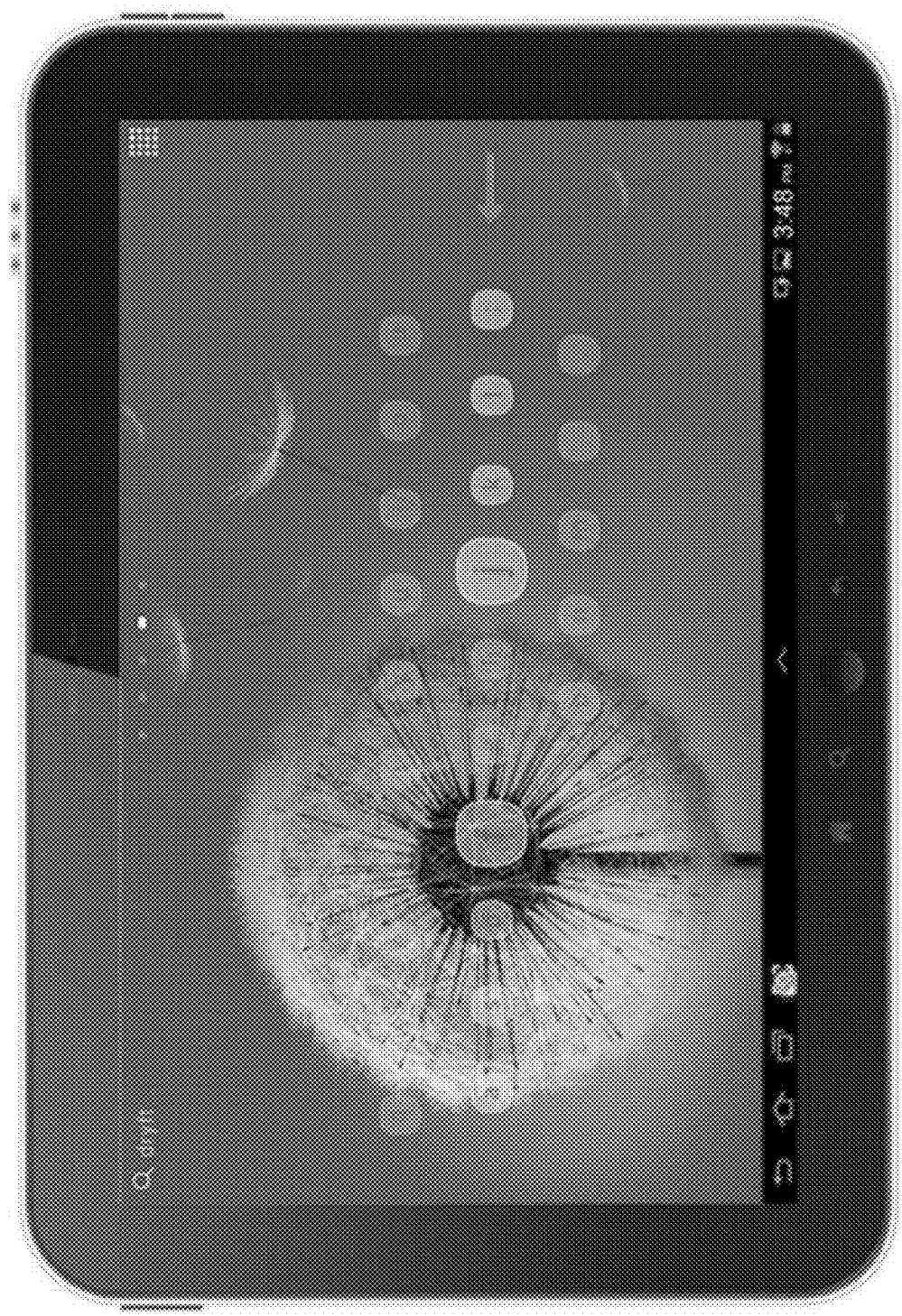
Figure 12:
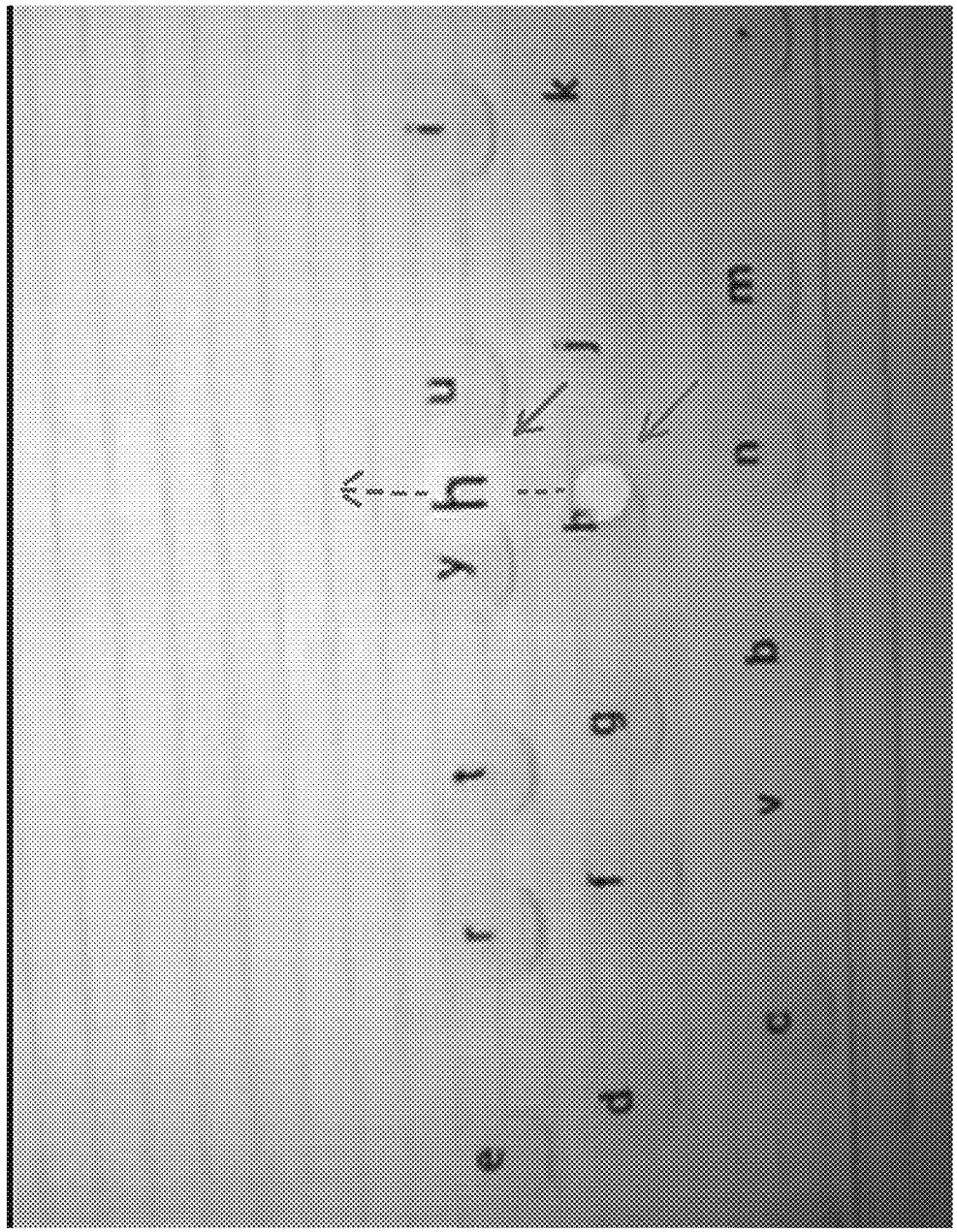

Various functions concerning non-haptic responding handheld touch pads (as to be used in PDAs, tablets, smart phones) with virtual (displayed only) keyboards have been presented by Dryft™, 855A Santa Cruz Avenue, Menlo Park. Calif. 94025, and shown on its website (see http://dryft.com/#about). One of Dryft's software functions is to adapt the keypad continuously with every keystroke to customize the key position of a touch screen user's hand and finger position and finger distances (see FIG. 9). The right hand and left hand QWERTY keyboard portion can be placed independently by drag and drop (See FIG. 10). Keys may have individual sizes and may be shown partially transparent (see FIG. 11). For better visual feedback, Dryft lets a bulb rise up with a key letter on it (gray arrow) originating from the point a keystroke was made (gray arrow), such as shown in FIG. 12. The bulb follows the dotted arrow. An algorithm may use the tablet's accelerometers to distinguish between fingers resting on the touch screen from a keystroke tapping.

The present invention provides vehicle inherent human interfaces, such as touch screen interfaces or alternatively a touch surface (without screen) related interfaces with a projector unit overtop, projecting onto the touch surface where both alternatives may have hardware to form tangible structures similar to these described in International Publication No. WO 2013/109869 and U.S. Pat. No. 8,547,339, and both alternatives may show a functional behavior such as these shown by Dryft™ for haptic neutral consumer handheld devices with touch screen input.

When offering keyboard keys to the user these may by tangible by protruding or popping out from the touch screen's or touch surface's normal plane. The tangible keys may always arrange or customize itself economically (biomorphene) to the user's hands and fingers, preferably to both hands independently. By that the keys protrude or pop out at that position the finger tips are resting on. The structural content and/or the keys may be colored and may have mappings, markings, icons, types or numbers or other display content displayed on top of it (screened or projected) and optionally in its surroundings.

Figure 15:
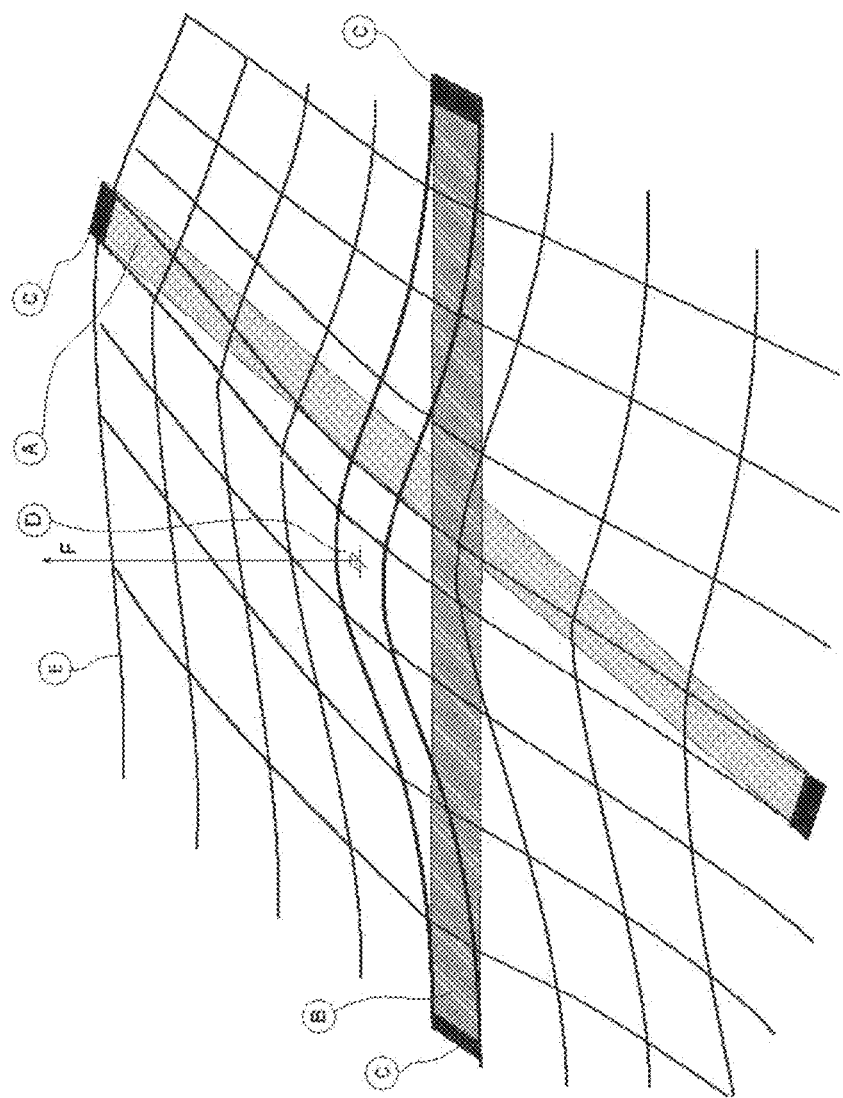

Optionally, the present geometrically structure's (such as a popped out key) appearance may be supplemented by any known art bump mapping, texture splatting or shading method. For example, a road map may be shown as a contour map by the formed structures. For providing more details the splatted visual map may be enhanced by 'bump mapping' by mapping the fine relief mapping. For example, an essentially round key elevation of limited height and slope (such as can be seen in FIG. 15) may be mapped by a 'displacement mapping' which may let the top of the key appear as being a square and may let its flanks appear as being steeper. Optionally, every keystroke may be visually animated comparably to the animation shown by Dryft™ in FIG. 12.

Optionally, since the surface may deform at every desired point, the touch surface or touch screen's surface may be animated by user inputs. For example, the surface may wobble as like a surface of fluid mercury, concentric waves may start from a point a finger is tapping at. Optionally, the surface may show further structural animations optionally from time to time, after a fixed time or a random time similar to known art screen savers, but not visually animated but structurally animated. For example, structures may hover around such as raindrops fall onto a water surface which emitted waves may diminish more and more along the way and may be reflected on the screens borderlines.

Optionally, the structural animations may be correlated to visual animations or may be de-correlated. Because the structural animated touch screen is meant to be used within a vehicle as a user interface, the screen is exposed to the shocks and vibrations that the vehicle encounters when driven. The vehicle's vibrations may be animated as a structural animation in the screen such as the vibration would cause waves, with additional animation of the waves becoming deflected and diffracted on screen content, such as letters and the like. Additionally, the vehicle's vibrations may be animated as structural animation by vibration of the screen content, such as the letters vibrating such as when these may be fixed elastically.

Use of proximity sensors, such as like capacitive sensors for detecting the closing of a user's hand to a vehicles touch screen or touch surface for controlling the backlighting illumination, may be provided, such as by utilizing aspects of International Publication No. WO 2013/109869. As an optional aspect of the present invention, the proximity sensors may also find use in a system arrangement as discussed above (having touch screen (or touch surface with projector unit) deformation actuators for forming tangible structures such as keys and having algorithm for arranging the keys economically (biomorphene)). These may be referred to as 'structure touch screen' (STS) and in combination with a proximity sensor 'structure proximity touch screen' (SPTS). Optionally, the system may determine the presence and location of a user's finger or fingers utilizing aspects of the systems described in U.S. Pat. No. 8,154,418, which is hereby incorporated herein by reference in its entirety.

Besides other functional controls, an embedded or external proximity sensor may be used for actuating the protruding or popping out of keys and/or structures when the user's finger tips are close to or approaching the screen, preferably directly under the area at which the finger tips are going to touch (a moment later). When moving the hand, the keyboard arrangement may follow the hand or finger tips also when the finger tips are not or not fully resting on the touch screen surface. Optionally, the local backlighting may dim up or the color may turn more intense when a hand or finger closes, as detected by the proximity sensor(s).

Optionally, there may be a time out time period which may start when the hand leaves the detection area of the proximity sensor. The keys may stay 'active' so elevated or protruded from normal as long the time out period does not lapse, and after the time out period has elapsed, the keys and/or structures may retract, whereby the touch screen returns to a normal flat screen such as for displaying information or the like. Optionally, the above optional capacitive sensor function may also find use in an arrangement using fixedly, non positionable deployable keys which may be not or just weakly able to be customized to the user's hand position (such as the keys described by Tactus but used in a vehicle interface). These may be referred to as 'key structure touch screen' (KTS) and in combination with a proximity sensor 'key structure proximity touch screen' (KPTS).

As another aspect of the invention for providing touchless gesture inputs, a haptic feedback especially in an in-cabin vehicle function control gesture system, a mid air haptic feedback device (HFD) may come into use. Such an input may utilize aspects of the systems described by UltraHaptics at its website (http://ultrahaptics.com/).

Figure 16:
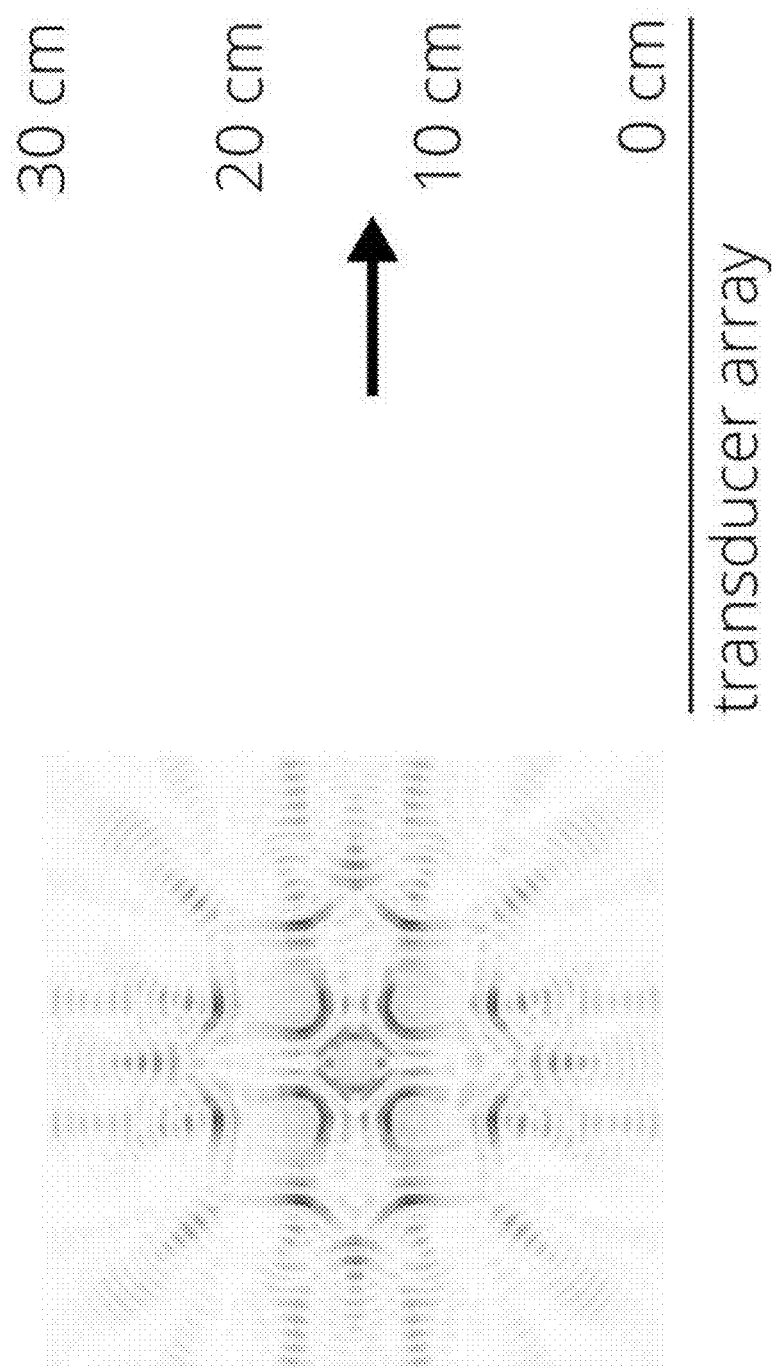
FIG. 16 is a schematic of a phased array of ultrasound transducers, which send a steady wave having focal points in distance to a transducer.
Figure 17:
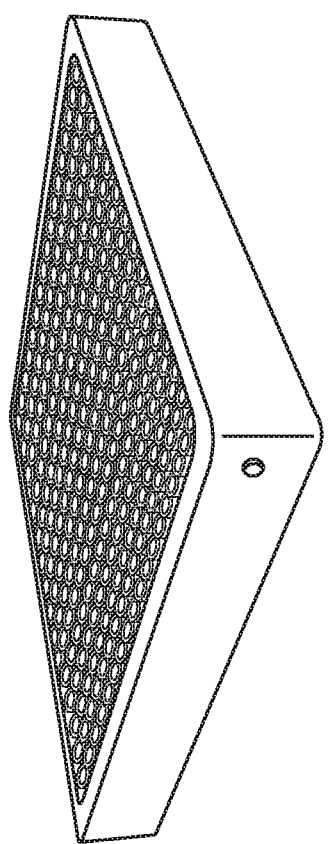
FIG. 17 is a perspective view of a transducer that receives the signal from the phased array of FIG. 17.

Optionally, the interaction of the driver and the vehicle may be enhanced when entering controls by touchless gestures. When combined to a visual gesture recognitions system based on cameras or an SPTS or a KPTS it will broaden the possibilities for the vehicle user to give control input without actually looking at the input device. The technology is based on a phased array of ultrasound transducers (see FIG. 16) sending a steady wave having focal points in distance to the transducer (see FIG. 17) aiming to the fingertips of a user, who is entering (vehicle function) controls by touchless gesture. Optionally, the HFD may be installed behind any instrument, dashboard or panel, behind the rooftop carpet, the top lighting column or under a SPTS, STS, KTS or KPTS or within a conventional head up display or a 3D head up display using aspects of the systems described in U.S. provisional application Ser. No. 62/129,284, filed Mar. 6, 2015, which is hereby incorporated herein by reference in its entirety. Optionally, the virtual touchable icon or letter arrangement may be combined with a biomorphene adaption (such as physical size or other biometric information about the user) as suggested above to adapt the virtual icons or letters to the user's hand size and habits over the time of use to ease input and improve the successful keystroking.

Optionally, the HFD, SPTS, STS, KTS or KPTS may act in combination with an audio feedback providing device as specified above being controlled in a way that a sound source spot is identically or at least close to the HFD, SPTS, STS, KTS or KPTS device. Optionally, the sound may be generated and correlated to the structural animations or may be correlated to visual animations or may be correlated to both and/or may be correlated to the haptic control feedback of the HFD to enhance the HMI's intuition and ascertainability.

The user inputs and/or HMIs of the present invention may be implemented for use with any accessory or system or function of a vehicle, such as for controlling a navigation system, a telematics system, a vehicle vision system, an audio system, and/or the like. The system or accessory or function may comprise any suitable or selected system or accessory or function, and may utilize aspects of the systems described in U.S. Pat. Nos. 7,855,755; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/1 03193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/1 26715 and/or WO 2013/158592, which are all hereby incorporated herein by reference in their entireties. The system may communicate with other communication systems via any suitable means, such as by utilizing aspects of the systems described in International Publication Nos. WO 2010/144900 and/or U.S. Publication No. US-2012-0062743, which are hereby incorporated herein by reference in their entireties.

Optionally, the user inputs may utilize aspects of the systems described in U.S. Pat. No. 7,855,755, and/or International Publication Nos. WO 2010/124064; WO 2011/044312; WO 2012/051500 and/or WO 2013/071070, which are all hereby incorporated herein by reference in their entireties. Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. Publication Nos. US-2006-0061008 and/or US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744 and/or 6,124,886, and/or U.S. Publication No. US-2006-0050018, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A human machine interface system for a vehicle, said human machine interface system comprising:
   a user input actuatable by a user and associated with at least one accessory of a vehicle equipped with said human machine interface system, wherein said user input comprises a touch screen and wherein said touch screen comprises a deformable touch surface that is deformable to form a plurality of protruding user inputs;
   a plurality of audible speakers disposed in the equipped vehicle, each of said plurality of audible speakers operable to generate a respective audible output, wherein said plurality of audible speakers is disposed in the equipped vehicle remote from said user input; and
   a control, wherein said control, responsive to actuation by the user of said user input, controls said speakers to generate respective audible outputs at said audible speakers so that the user perceives that a resulting sound originates at or near said user input.

2. The human machine interface system of claim 1, wherein said control, responsive to a vehicle function, is operable to generate respective second audible outputs at said audible speakers so that the user perceives that a second resulting sound originates at a location associated with said vehicle function.

3. The human machine interface system of claim 2, wherein said vehicle function comprises a vision system of the equipped vehicle and wherein the user perceives that the second resulting sound originates at or near or towards a location where an object is detected external the equipped vehicle.

4. The human machine interface system of claim 1, wherein said touch screen comprises a proximity sensor and, responsive to detection by said proximity sensor that a user's hand is at or near said touch screen, said user inputs are adjusted to protrude from a plane of said touch screen.

5. The human machine interface system of claim 1, wherein said deformable touch surface is adjustable responsive to a proximity of the user's hand.

6. The human machine interface system of claim 5, wherein said deformable touch surface is adjustable to adjust an arrangement of said user inputs to follow the user's hand or finger when the user's hand or finger is not contacting said touch surface.

7. The human machine interface system of claim 6, wherein local backlighting of said touch screen is adjusted responsive to determination of a closer proximity of the user's hand or finger.

8. The human machine interface system of claim 6, wherein said arrangement of said user inputs comprises a keypad arrangement.

9. The human machine interface system of claim 1, wherein said deformable touch surface is deformable to adjust said user inputs responsive to biometric information of the user.

10. The human machine interface system of claim 1, wherein said deformable touch surface is deformable to adjust said user inputs responsive to learned actions of the user.

11. The human machine interface system of claim 1, wherein said user inputs comprise a plurality of icons or letters and wherein said deformable touch surface is deformable to adjust the size of the icons or letters responsive to at least one of (i) biometric information of the user and (ii) learned actions of the user.

12. A human machine interface system for a vehicle, said human machine interface system comprising:
    a user input actuatable by a user and associated with at least one accessory of a vehicle equipped with said human machine interface system, wherein said user input comprises a touch screen and wherein said touch screen comprises a deformable touch surface that is deformable to form a plurality of user inputs;
    wherein said touch screen comprises a proximity sensor and, responsive to detection by said proximity sensor that a user's hand is at or near said touch screen, said deformable touch surface is deformable to adjust said user inputs to protrude from a plane of said touch screen;
    wherein said user inputs comprise a plurality of icons or letters and wherein said deformable touch surface is deformable to adjust the size of the icons or letters responsive to at least one of (i) biometric information of the user and (ii) learned actions of the user; and
    wherein said human machine interface system comprises a plurality of audible speakers and a control, and wherein each of said plurality of audible speakers is operable to generate a respective audible output, and wherein said plurality of audible speakers is disposed in the vehicle remote from said user input, and wherein said control, responsive to actuation by the user of said user input, controls said audible speakers to generate respective audible outputs at said audible speakers so that the user perceives that a resulting sound originates at or near said user input.

13. The human machine interface system of claim 12, wherein said control, responsive to a vehicle function, is operable to generate respective second audible outputs at said audible speakers so that the user perceives that a second resulting sound originates at a location associated with said vehicle function.

14. The human machine interface system of claim 13, wherein said vehicle function comprises a vision system of the vehicle and wherein the user perceives that the second resulting sound originates at or near or towards a location where an object is detected external the vehicle.

15. The human machine interface system of claim 12, wherein said deformable touch surface is deformable to adjust said user inputs responsive to a proximity of the user's hand, and wherein an arrangement of said user inputs is adjustable to follow the user's hand or finger when the user's hand or finger is not contacting said touch surface, and wherein local backlighting of said touch screen is adjusted responsive to determination of a closer proximity of the user's hand or finger.

16. The human machine interface system of claim 12, wherein said deformable touch surface is deformable to adjust the size of the icons or letters responsive to biometric information of the user.

17. The human machine interface system of claim 12, wherein said deformable touch surface is deformable to adjust the size of the icons or letters responsive to learned actions of the user.

18. A human machine interface system for a vehicle, said human machine interface system comprising:
    a user input actuatable by a user and associated with at least one accessory of a vehicle equipped with said human machine interface system, wherein said user input comprises a touch screen and wherein said touch screen comprises a deformable touch surface that is deformable to form a plurality of user inputs;
    wherein said touch screen comprises a proximity sensor and, responsive to detection by said proximity sensor that a user's hand is at or near said touch screen, said deformable touch surface is deformable to adjust said user inputs to protrude from a plane of said touch screen;
    wherein said deformable touch surface is deformable to adjust said user inputs responsive to a proximity of the user's hand, and wherein an arrangement of said user inputs is adjustable to follow the user's hand or finger when the user's hand or finger is not contacting said touch surface;
    wherein local backlighting of said touch screen is adjusted responsive to determination of a closer proximity of the user's hand or finger;
    wherein said user inputs comprise a plurality of icons or letters and wherein said deformable touch surface is deformable to adjust the size of the icons or letters responsive to at least one of (i) biometric information of the user and (ii) learned actions of the user;
    a plurality of audible speakers operable to generate respective audible outputs, wherein said audible speakers are disposed in the vehicle remote from said user input, and wherein a control, responsive to actuation by the user of said user input, controls said audible speakers to generate respective audible outputs at said audible speakers so that the user perceives that a resulting sound originates at or near said user input.

19. The human machine interface system of claim 18, wherein said plurality of audible speakers comprises at least three audible speakers operable to generate respective audible outputs, and wherein said at least three audible speakers are disposed in the vehicle remote from said user input.

20. The human machine interface system of claim 19, wherein said control, responsive to a vehicle function, is operable to generate respective second audible outputs at said audible speakers so that the user perceives that a second resulting sound originates at a location associated with said vehicle function, and wherein said vehicle function comprises a vision system of the vehicle and wherein the user perceives that the second resulting sound originates at or near or towards a location where an object is detected external the vehicle.

* * * * *